(12) United States Patent
Sadanaga et al.

(10) Patent No.: US 6,713,546 B2
(45) Date of Patent: Mar. 30, 2004

(54) ONE-PACK ROOM TEMPERATURE-CURABLE SEALANT COMPOSITION FOR AUTOMOBILE

(75) Inventors: Hiroki Sadanaga, Hachioji (JP); Masayasu Sakata, Wako (JP)

(73) Assignees: Three Bond Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/358,920

(22) Filed: Feb. 5, 2003

(65) Prior Publication Data

US 2003/0162928 A1 Aug. 28, 2003

(30) Foreign Application Priority Data

Feb. 5, 2002 (JP) .......................................... 2002-027928

(51) Int. Cl.$^7$ ................................................ C08K 3/22
(52) U.S. Cl. ........................ 524/432; 524/430; 524/588; 528/34; 528/38
(58) Field of Search ................ 528/34, 38; 524/430, 524/432; 556/424

(56) References Cited

U.S. PATENT DOCUMENTS

| | | | | |
|---|---|---|---|---|
| 5,231,207 A | * | 7/1993 | Yanagisawa et al. | ........ 556/424 |
| 5,292,606 A | * | 3/1994 | Fitzgerald | .................. 428/35.8 |
| 2002/0091220 A1 | * | 7/2002 | Kimura | ........................ 528/10 |

* cited by examiner

Primary Examiner—Margaret G. Moore
(74) Attorney, Agent, or Firm—Dilworth & Barrese LLP

(57) ABSTRACT

A one-pack room temperature-curable sealant composition, namely, liquid gasket (FIPG) manifesting an excellent adhesive property and chemical resistance also for an automobile magnesium alloy material single body, and being able to be used also for cast iron and aluminum members and the like conventionally used is provided.

(A) an organopolysiloxane which both ends of the molecular chain are each blocked by a hydroxyl group and the viscosity at 25° C. is from 30000 to 70000 mPa·s, (B) a cross-linking agent, (C) zinc carbonate and/or zinc oxide, (D) tabular alumina having an average particle size of 5 $\mu$m or less, and (E) a silane coupling agent of the following general formula (1):

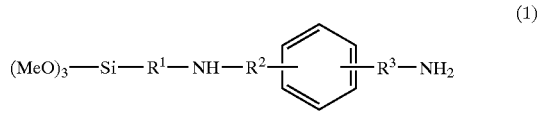

(1)

(wherein $R^1$, $R^2$ and $R^3$ represent a divalent hydrocarbon group having 1 to 3 carbon.).

are combined, to provide one-pack room temperature-curable sealant composition for use in automobile.

20 Claims, No Drawings

ONE-PACK ROOM TEMPERATURE-CURABLE SEALANT COMPOSITION FOR AUTOMOBILE

BACKGROUND OF THE INVENTION

1. Field of the Invention

The present invention relates to a one-pack room temperature-curable sealant composition for automobile, and particularly, to a one-pack room temperature-curable liquid gasket (FIPG) manifesting an excellent adhesive property not only for automobile members or parts made of cast iron and aluminum widely used conventionally but also for automobile members made of magnesium alloy paid to attention recently, and having excellent durability against engine oils, gear oils, automatic transmission oils, long life coolants and the like.

2. Description of the Related Art

Conventionally, most of materials of automobile metal members are made of cast iron, aluminum and the like, and since an adhesive property to the metals is sufficiently obtained even if conventional automobile sealants are used, there was no problem in adhesion and sealing property.

However, recently, a magnesium alloy of which weight is about two third of aluminum is paid to attention as an automobile member. As members already investigated and put into practical use, examples thereof around body include sheet frames, instrument panels, door handles, window motor housings, radio amplifier housings, mirror brackets, head light retainers, sheet belt parts, sun roof frames, wind shield arms, convertible top frames, name plates and the like, examples thereof around engine include cylinder head covers, oil pump housings, oil filter adapters, engine oil pans, intake manifolds, EGR system bulb covers, turbo charger parts, throttle bodies, starter housing and the like, examples thereof around driving system include clutch housings, MT housings, AT stators, AT side covers, AT housings, AT pistons and the like, and examples thereof around chassis include wheels, steering cores, steering cram parts, brake pedal brackets and the like.

In actual use of a magnesium alloy, conversion-coating treatments (chromic acid treatment, dichromic acid treatment, improved chromic acid treatment, ferric nitrate treatment, stannate treatment and the like) are performed depending on use to improve corrosion resistance, heat resistance and the like.

However, cost increases significantly since the conversion-coating treatment is complicated, and practical use of a magnesium alloy without any surface treatment is increasing recently.

In magnesium alloy members on which surface treatment has been performed, by using a conventional liquid gasket (FIPG), for example, Three Bond 1216E, 1217F, 1280E and the like (manufactured by Three Bond Co. Ltd.), an adhesive property sufficient for coagulation fracture (CF) is obtained, and use as a present commodity is possible, causing no problem. However, in magnesium alloy members on which surface treatment has not been performed, a sufficient adhesive property is not obtained, leading to interface fracture (AF). When a sufficient adhesive property is not obtained in a liquid gasket, a possibility of surface contact leakage due to vibration, impact and the like during driving is high, therefore, it is necessary to obtain a satisfactory adhesive causing not interface fracture but coagulation fracture.

In obtaining a sufficient adhesive property (coagulation fracture) to a magnesium alloy material (which has not substantially been subjected to surface treatment), improvement is known to be possible by using means such as surface UV washing, metal primer and the like, however, such means are very inefficient from the standpoints of use of materials, increase in step number, environmental problems and the like.

SUMMARY OF THE INVENTION

The main object of the present invention is to provide a one-pack room temperature-curable sealant composition, namely, liquid gasket (FIPG), manifesting an excellent adhesive property and a chemical resistance also for an automobile magnesium alloy material single body, and being able to be used also for cast iron and aluminum members and the like conventionally used.

The one-pack room temperature-curable liquid gasket for automobile of the present invention is composed of a composition comprising (A) an organopolysiloxane which both ends of the molecular chain are each blocked by a hydroxyl group and the viscosity at 25° C. is from 30000 to 70000 mPa·s, (B) a cross-linking agent, (C) zinc carbonate and/or zinc oxide, (D) tabular alumina having an average particle size of 5 μm or less, and (E) a silane coupling agent of the following general formula (1):

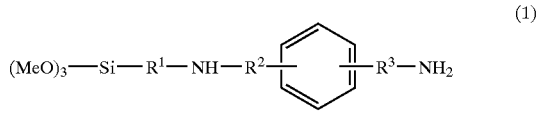

(1)

(wherein $R^1$, $R^2$ and $R^3$ represent each independently a divalent hydrocarbon group having 1 to 3 carbon atoms, and Me represents a methyl group.).

DESCRIPTION OF THE PREFERRED EMBODIMENTS

In the present invention, the component (A) is a main component constituting the sealant composition of the present invention wherein both ends of the molecular chain are each blocked by a hydroxyl group and the viscosity at 25° C. is from 30000 to 70000 mPa·s. The organic group bonded to siloxane silicon is preferably a lower alkyl group having 1 to 4 carbon atoms or a phenyl group, and particularly preferably a methyl group. When the viscosity is 30000 mPa·s or less, the resulting rubber shows too high modulus, leading to decrease in adhesion to a magnesium alloy, and when over 70000 mPa·s, the composition shows too high viscosity, being not practical.

The component (B) is a cross-linking component in the composition of the present invention, and preferably a silane of the general formula (3):

(wherein $R^4$ is not present or represents a monovalent hydrocarbon group, X represents a hydrolyzable group, and n represents 3 or 4.)

or a hydrolyzate thereof. When $R^4$ represents a monovalent hydrocarbon group in the general formula (3), examples thereof include preferably alkyl groups or alkenyl groups having 1 to 6 carbon atoms such as a methyl group, ethyl group, vinyl group and the like. Examples of the hydrolyzable group X include alkoxy groups such as a methoxy group, ethoxy group, propoxy group and the like, alkenyloxy groups such as an isopropenoxy group, 1-ethyl-2-methylvinyloxime group and the like, keto oxime groups such as a dimethyl keto oxime group, methyl ethyl keto oxime group and the like, acyloxy groups such as an acetoxy group, propionoxy group, butyloyloxy group, benzoyloxime group and the like, amino groups such as a dimethylamino group, diethylamino group and the like, aminoxy groups such as a dimethylaminoxy group, diethylaminoxy group and the like, and amide groups such as an N-methylacetamide group, N-ethylacetamide group, N-methylbenzamide group and the like.

Examples of the component (B) include ethyl silicate, propyl silicate, methyltrimethoxysilane, methylethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, vinyltrimethylethyl keto oxime silane, methyltrimethylethyl keto oxime silane, methyltri(butanoxime)silane, vinyltri(butanoxime) silane, phenyltri(butanoxime)silane, propyltri(butanoxime) silane, tetra(butanoxime)silane, 3,3,3-trifluoropropyl (butanoxime)silane, 3-chloropropyl(butanoxime)silane, methyltri(propanoxime)silane, methyltri(butanoxime) silane, methyltri(isopentanoxime)silane, vinyl (cyclopentanoxime)silane, methyltri(cyclohexanoxime) silane and the like and partial hydrolyzates thereof. Particularly, vinyltrimethylethyl keto oximesilane, methyltrimethylethyl keto oxime silane or a mixture thereof is suitably used. The amount of the component (B) is usually from 6 to 10 parts by weight, preferably from 7 to 9 parts by weight based on 100 parts by weight of the component (A). When less than 6 parts by weight, the composition tends to be gelled in kneading, and when over 10 parts by weight, sufficient rubber physical property is not obtained, leading to fragile cured substance.

The component (C) is a filler composed of zinc carbonate and/or zinc oxide. This filler improves the chemical resistance of the composition, and by a synergic effect with other components, an adhesive property to a magnesium alloy member is improved. The amount of the component (C) is usually from 60 to 120 parts by weight, preferably from 70 to 90 parts by weight based on 100 parts by weight of the component (A). When less than 60 parts by weight, chemical resistance is insufficient, and when over 100 parts by weight, sufficient rubber physical property is not obtained, leading to a fragile composition, and the viscosity of the composition increases impractically.

The component (D) is tabular alumina having an average particle size of 5 μm or less, suppresses deformation of a rubber cured substance in immersion liquid, further, improves an adhesive property. The tabular form means a form obtained by crushing sphere, namely, disk form, and the average particle size is represented by the average value of the diameter of a disk. The amount of the component (D) is usually from 5 to 20 parts by weight based on 100 parts by weight of the component (A). When less than 5 parts by weight, a sufficient adhesive property is not obtained, and when over 20 parts by weight, sufficient rubber physical property is not obtained, leading to a fragile composition.

The component (E) is a silane coupling agent of the general formula (1), and the selected chemical structure of the general formula (1) exerts a large effect as an agent of improving adhesion particularly to a magnesium alloy. The amount of the component (E) is usually from 1.0 to 2.0 parts by weight based on 100 parts by weight of the component (A). When less than 1.0 part by weight, a sufficient adhesive property is not manifested, and when blended in an amount of over 2.0 parts by weight, a sufficient rubber physical property is not obtained, the composition becomes fragile, leading to increased cost.

The composition of the present invention shows effects such as an excellent adhesive property and the like particularly as a liquid gasket for automobile magnesium alloy members, by simultaneous use of the above-mentioned components (A) to (E), and it is preferable to use further other components together.

One of such components is (F) a silane coupling agent of the following general formula (2):

$$(EtO)_3-Si-R^5-NH_2 \qquad (2)$$

(wherein $R^5$ represents a divalent hydrocarbon group having 1 to 3 carbon atoms, for example, an alkylene group such as a methylene group, ethylene group or propylene group, and Et represents an ethyl group.).

The component (F), silane coupling agent is also an agent of improving adhesion to impart an adhesive property to magnesium alloy to the composition of the present invention, and the its amount is usually from 0.5 to 1.0 part by weight based on 100 parts by weight of the component (A). When less than 0.5 parts by weight, a sufficient adhesive property of itself is not manifested, and when blended in an amount of over 1.0 part by weight, the chemical property of a cured substance lowers.

Further one of components is (G) a fumed silica which has a specific surface area of from 100 to 200 m²/g and of which surface has been treated with dimethylchlorosilane, and used for reinforcing the composition and for imparting thixotropy. The amount of the component (G) is usually from 5 to 20 parts by weight, preferably from 8 to 12 parts based on 100 parts by weight of the component (A). When less than 5 parts by weight, impartment of thixotropy is insufficient, and when over 20 parts by weight, the viscosity of the composition increases impractically.

Further one of components is (H) a condensation catalyst for accelerating the curing of the composition of the present invention by moisture. As the component (H), condensation catalysts generally used conventionally as a curing accelerator for a room temperature-curable composition are listed, and examples thereof include organotin compounds such as dibutyltin dimethoxide, dibutyltin diacetate, dibutyltin dioctate, dibutytin dilaurate, dimethyltin dimethoxide, dimethyltin diacetate, dioctyltin dilaurate and the like, organic titanium compounds such as tetrapropyl titanate, tetrabutyl titanate, tetra-2-ethylhexyl titanate, dimethoxytitaniumdiacetyl acetonate and the like, amine compounds such as hexylamine, 3-aminopropyltrimethoxysilane, tetramethylguanidylpropyltrimethoxysilane and the like, and salts thereof, and guanidine compounds and the like. These can be used singly or in combination of two or more. The amount of the component (H) is usually from 0.05 to 5 parts by weight based on 100 parts by weight of the component (A). When less than 0.05 parts by weight, a sufficient curing property of itself is not obtained, and when over 0.5 parts by weight, the heat resistance, durability and the like of the composition decrease.

The one-pack room temperature-curable liquid gasket (FIPG) for use in automobile of the present invention is obtained by mixing the above-mentioned components uniformly under a dried atmosphere. Further, coloring agents such as pigments, dyes and the like, heat resistance improvers such as iron oxide and the like, and reinforcing fillers such as a quartz powder and the like can be optionally added in an amount within the range wherein an adhesive property to a magnesium alloy is not deteriorated.

EXAMPLES

The following examples/comparative examples will specifically illustrate the present invention but doe not limit the scope of the invention. The viscosity is a value measured at 23° C.±2° C. $C_6H_4$ in chemical formulae means a benzene ring.

Comparative Example 1

| | |
|---|---|
| Dimethylpolysiloxane which both ends of the molecular chain are each blocked with a hydroxyl group and having a viscosity of 5000 mPa · s | 100 parts by weight |
| Methyltributanoxime silane | 8 parts by weight |
| Calcium carbonate powder | 80 parts by weight |
| Tabular alumina | 15 parts by weight |
| Fumed silica | 8 parts by weight |
| $(MeO)_3$—Si—$CH_2$—NH—$CH_2$—$C_6H_4$—$CH_2$—$NH_2$ | 1.5 parts by weight |
| γ-aminopropyltriethoxysilane | 0.8 parts by weight |
| and dibutyltin dioctoate | 0.2 parts by weight | were mixed under anhydrous condition to prepare a curable silicone rubber composition.

Comparative Example 2

| | |
|---|---|
| Dimethylpolysiloxane which both ends of the molecular chain are each blocked with a hydroxyl group and having a viscosity of 5000 mPa · s | 100 parts by weight |
| Dimethylbutanoxime silane | 8 parts by weight |
| Zinc oxide powder | 80 parts by weight |
| Fumed silica | 8 parts by weight |
| $(MeO)_3$—Si—$CH_2$—NH—$CH_2$—$C_6H_4$—$CH_2$—$NH_2$ | 1.5 parts by weight |
| γ-aminopropyltriethoxysilane | 0.8 parts by weight |
| and dibutyltin dioctoate | 0.2 parts by weight | were mixed under anhydrous condition to prepare a curable silicone rubber composition.

Comparative Example 3

| | |
|---|---|
| Dimethylpolysiloxane which both ends of the molecular chain are each blocked with a hydroxyl group and having a viscosity of 5000 mPa · s | 100 parts by weight |
| Methyltributanoxime silane | 8 parts by weight |
| Zinc oxide powder | 80 parts by weight |
| Tabular alumina | 15 parts by weight |
| Fumed silica | 8 parts by weight |
| γ-aminopropyltriethoxysilane | 2.3 parts by weight |
| and dibutyltin dioctoate | 0.2 parts by weight | were mixed under anhydrous condition to prepare a curable silicone rubber composition.

Comparative Example 4

| | |
|---|---|
| Dimethylpolysiloxane which both ends of the molecular chain are each blocked with a hydroxyl group and having a viscosity of 2000 mPa · s | 100 parts by weight |
| Methyltributanoxime silane | 8 parts by weight |
| Zinc oxide powder | 80 parts by weight |
| Tabular alumina | 15 parts by weight |
| Fumed silica | 8 parts by weight |
| $(MeO)_3$—Si—$CH_2$—NH—$CH_2$—$C_6H_4$—$CH_2$—$NH_2$ | 1.5 parts by weight |
| γ-aminopropyltriethoxysilane | 0.8 parts by weight |
| and dibutyltin dioctoate | 0.2 parts by weight | were mixed under anhydrous condition to prepare a curable silicone rubber composition.

Example 1

| | |
|---|---|
| Dimethylpolysiloxane which both ends of the molecular chain are each blocked with a hydroxyl group and having a viscosity of 5000 mPa · s | 100 parts by weight |
| Methyltributanoxime silane | 8 parts by weight |
| Zinc oxide powder | 80 parts by weight |
| Tabular alumina | 15 parts by weight |
| Fumed silica | 8 parts by weight |
| $(MeO)_3$—Si—$CH_2$—NH—$CH_2$—$C_6H_4$—$CH_2$—$NH_2$ | 1.5 parts by weight |
| γ-aminopropyltriethoxysilane | 0.8 parts by weight |
| and dibutyltin dioctoate | 0.2 parts by weight | were mixed under anhydrous condition to prepare a curable silicone rubber composition.

Example 2

| | |
|---|---|
| Dimethylpolysiloxane which both ends of the molecular chain are each blocked with a hydroxyl group and having a viscosity of 35000 mPa · s | 100 parts by weight |
| Methyltributanoxime silane | 8 parts by weight |
| Zinc oxide powder | 80 parts by weight |
| Tabular alumina | 15 parts by weight |
| $(MeO)_3$—Si—$C_3H_6$—NH—$CH_2$—$C_6H_4$—$CH_2$—$NH_2$ and | 1.5 parts by weight |
| dibutyltin dioctoate | 0.2 parts by weight | were mixed under anhydrous condition to prepare a curable silicone rubber composition.

Example 3

| | |
|---|---|
| Dimethylpolysiloxane which both ends of the molecular chain are each blocked with a hydroxyl group and having a viscosity of 5000 mPa · s | 100 parts by weight |
| Methyltributanoxime silane | 8 parts by weight |
| Zinc oxide powder | 80 parts by weight |
| Tabular alumina | 15 parts by weight |
| Fumed silica | 8 parts by weight |
| $(MeO)_3$—Si—$C_3H_6$—NH—$CH_2$—$C_6H_4$—$C_2H_4$—$NH_2$ | 1.5 parts by weight |
| γ-aminopropyltriethoxysilane and | 0.8 parts by weight |
| dibutyltin dioctoate | 0.2 parts by weight | were mixed under anhydrous condition to prepare a curable silicone rubber composition.

Example 4

| | |
|---|---|
| Dimethylpolysiloxane which both ends of the molecular chain are each blocked with a hydroxyl group and having a viscosity of 5000 mPa · s | 100 parts by weight |
| Vinyltributanoxime silane | 8 parts by weight |
| Zinc oxide powder | 80 parts by weight |
| Tabular alumina | 15 parts by weight |
| Fumed silica | 8 parts by weight |
| $(MeO)_3$—Si—$CH_2$—NH—$C_2H_4$—$C_6H_4$—$CH_2$—$NH_2$ | 1.5 parts by weight |
| γ-aminopropyltriethoxysilane and | 0.8 parts by weight |
| dibutyltin dilaurate | 0.2 parts by weight | were mixed under anhydrous condition to prepare a curable silicone rubber composition.

The compositions were molded into a sheet having a thickness of 2 mm, and aged for 7 days under an atmosphere of 23±2° C.×50±5° C. RH, to obtain rubber elastomer. The physical properties of them were measure according to JIS-K-6249, to obtain results shown in Table 1. For confirming an adhesive property to a magnesium alloy, a magnesium alloy body having a width of 25 mm and a length of 100 mm and an aluminum body were adhered with a sealant thickness of 1 mm and a lapping width of 10 mm to make shearing adhesion test pieces having a adhesion area of 2.5 cm$^2$, and aged for 7 days under an atmosphere of 23±2° C.×50±5° C. RH, then pulled to a shearing direction at a rate of 50 mm/min to measure tensile shearing adhesion strength. Simultaneously, sealant broken condition (coagulation fracture ratio) of the adhered surface was visually confirmed. The results are shown in Table 1.

TABLE 1

| Item | Unit | Comparative Example 1 | Comparative Example 2 | Comparative Example 3 | Comparative Example 4 | Example 1 | Example 2 | Example 3 | Example 4 |
|---|---|---|---|---|---|---|---|---|---|
| Hardness | — | 50 | 40 | 52 | 62 | 48 | 40 | 51 | 48 |
| Tensile strength | Mpa | 2.5 | 2.0 | 2.6 | 2.9 | 2.9 | 2.1 | 2.9 | 2.8 |
| Elongation | % | 350 | 400 | 300 | 210 | 420 | 480 | 380 | 400 |
| Tensile shearing adhesion strength (Al/Al) | Mpa | 2.3 | 1.8 | 2.4 | 2.6 | 2.1 | 1.9 | 2.7 | 2.5 |
| Coagulation fracture ratio | % | 100 | 100 | 100 | 100 | 100 | 100 | 100 | 100 |
| Tensile shearing adhesion strength (Mg/Al) | Mpa | 0.9 | 0.8 | 0.5 | 0.7 | 2.0 | 1.9 | 2.6 | 2.4 |
| Coagulation fracture ratio | % | 0 | 0 | 0 | 0 | 100 | 100 | 100 | 100 |

As shown in Table 1, Comparative Example 1 to 4 show sufficient adhesion to aluminum, however, show no adhesion to a magnesium alloy, on the other hand, in Examples 1 to 4, a sufficient adhesive property is obtained also to a magnesium alloy like a conventional aluminum alloy.

For imparting an adhesive property to a magnesium alloy material single body, it has been found effective to use tabular aluminum oxide as an additive and to use a special silane coupling agent together, and further, as a result of study of amount, structure and the like, a one-pack room temperature-curable liquid gasket (FIPG) for use in automobile manifesting an excellent adhesive property and chemical resistance also for an automobile magnesium alloy material single body, and being able to be used also for cast iron and aluminum members and the like conventionally used has been found.

What is claimed is:

1. A one-pack room temperature-curable sealant composition for automobile comprising
   (A) an organopolysiloxane which both ends of the molecular chain are each blocked by a hydroxyl group and the viscosity at 25° C. is from 30000 to 70000 mPa·s,
   (B) a cross-linking agent,
   (C) zinc carbonate and/or zinc oxide,
   (D) tabular alumina having an average particle size of 5 μm or less, and
   (E) a silane coupling agent of the following general formula (1):

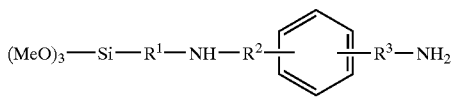
(1)

(wherein $R^1$, $R^2$ and $R^3$ represent each independently a divalent hydrocarbon group having 1 to 3 carbon atoms, and Me represents a methyl group.).

2. The one-pack room temperature-curable sealant composition for automobile according to claim 1 wherein the amount of the component (B) is from 6 to 10 parts by weight, the compounding amount of the component (C) is from 60 to 100 parts by weight, the amount of the component (D) is from 5 to 20 parts by weight and the amount of the component (E) is from 1 to 2 parts by weight based on 100 parts by weight of the component (A).

3. The one-pack room temperature-curable sealant composition for automobile according to claim 1 wherein the composition further comprises (F) a silane coupling agent of the following general formula (2):

(2)

(wherein $R^5$ represents a divalent hydrocarbon group having 1 to 3 carbon atoms, and Et represents an ethyl group.).

4. The one-pack room temperature-curable sealant composition for automobile according to claim 3 wherein the amount of the component (F) is from 0.1 to 1 parts by weight based on 100 parts by weight of the component (A).

5. The one-pack room temperature-curable sealant composition according to claim 1 wherein the component (B) is a silane of the general formula (3):

(wherein $R^4$ is not present or represents a monovalent hydrocarbon group, X represents a hydrolyzable group, and n represents 3 or 4.) or a hydrolyzate thereof.

6. The one-pack room temperature-curable sealant composition for automobile according to claim 1, wherein the component (B) is vinyltrimethylethyl keto oxime silane and/or methyltrimethylethyl keto oxime silane.

7. The one-pack room temperature-curable sealant composition for automobile according to claim 5 wherein X in the general formula (3) for the component (3) represents an alkoxy group, alkenyloxy group, keto oxime group, acyloxyl group, amino group, aminoxy group and/or amino group.

8. The one-pack room temperature-curable sealant composition for automobile according to claim 2 wherein the composition further comprises (F) a silane coupling agent of the following general formula (2):

(2)

(wherein $R^5$ represents a divalent hydrocarbon group having 1 to 3 carbon atoms, and Et represents an ethyl group.).

9. The one-pack room temperature-curable sealant composition according to claim 2 wherein the component (B) is a silane of the general formula (3):

(wherein $R^4$ is not present or represents a monovalent hydrocarbon group, x represents a hydrolyzable group, and n represents 3 or 4.) or a hydrolyzate thereof.

10. The one-pack room temperature-curable sealant composition according to claim 3 wherein the component (B) is a silane of the general formula (3):

(wherein $R^4$ is not present or represents a monovalent hydrocarbon group, x represents a hydrolyzable group, and n represents 3 or 4.) or a hydrolyzate thereof.

11. The one-pack room temperature-curable sealant composition according to claim 4 wherein the component (B) is a silane of the general formula (3):

(wherein $R^4$ is not present or represents a monovalent hydrocarbon group, x represents a hydrolyzable group, and n represents 3 or 4.) or a hydrolyzate thereof.

12. The one-pack room temperature-curable sealant composition according to claim 8 wherein the component (B) is a silane of the general formula (3):

(wherein $R^4$ is not present or represents a monovalent hydrocarbon group, x represents a hydrolyzable group, and n represents 3 or 4.) or a hydrolyzate thereof.

13. The one-pack room temperature-curable sealant composition for automobile according to claim 2, wherein the component (B) is vinyltrimethylethyl keto oxime silane and/or methyltrimethylethyl keto oxime silane.

14. The one-pack room temperatue-curable sealant composition for automobile according to claim 3, wherein the component (B) is vinyltrimethylethyl keto oxime silane and/or methyltrimethylethyl keto oxime silane.

15. The one-pack room temperatue-curable sealant composition for automobile according to claim 4, wherein the component (B) is vinyltrimethylethyl keto oxime silane and/or methyltrimethylethyl keto oxime silane.

16. The one-pack room temperature-curable sealant composition for automobile according to claim 5, wherein the component (B) is vinyltrimethylethyl keto oxime silane and/or methyltrimethylethyl keto oxime silane.

17. The one-pack temperature-curable sealant composition for automobile according to claim 8, wherein the component (B) is vinyltrimethylethyl keto oxime silane and/or methyltrimethylethyl keto oxime silane.

18. A method of sealing an automobile member with a sealant which comprises using the one-pack room temperature-curable sealant composition according to claim 1 as the sealant.

19. The method according to claim 18 wherein the automobile member is made of an aluminum-containing material.

20. The method according to claim 18, wherein the automobile member is an automobile body member, automobile engine member or automobile driving system member.

* * * * *